(12) United States Patent
Eisele et al.

(10) Patent No.: US 11,892,061 B2
(45) Date of Patent: Feb. 6, 2024

(54) COAXIAL GEAR SET

(71) Applicant: Kraken Innovations GmbH, Graz (AT)

(72) Inventors: Philipp Simon Eisele, Wiener Neustadt (AT); Michael Michelitsch, Graz (AT)

(73) Assignee: Kraken Innovations GmbH, Graz (AT)

( * ) Notice: Subject to any disclaimer, the term of this patent is extended or adjusted under 35 U.S.C. 154(b) by 68 days.

(21) Appl. No.: 17/626,663

(22) PCT Filed: Jul. 24, 2020

(86) PCT No.: PCT/EP2020/070901
§ 371 (c)(1),
(2) Date: Jan. 12, 2022

(87) PCT Pub. No.: WO2021/018752
PCT Pub. Date: Feb. 4, 2021

(65) Prior Publication Data
US 2022/0252140 A1 Aug. 11, 2022

(30) Foreign Application Priority Data
Jul. 26, 2019 (AT) .............. A 50680/2019

(51) Int. Cl.
*F16H 49/00* (2006.01)
*F16H 25/06* (2006.01)
(52) U.S. Cl.
CPC .......... *F16H 25/06* (2013.01); *F16H 49/001* (2013.01)
(58) Field of Classification Search
CPC ................ F16H 25/06; F16H 49/001
(Continued)

(56) References Cited

U.S. PATENT DOCUMENTS 1,543,791 A    8/1920  Pitter
4,798,104 A *  1/1989  Chen ............... F16H 25/06
                                              475/159
(Continued)

FOREIGN PATENT DOCUMENTS

CA        709203 A     5/1965
CN       2327841 Y     7/1999
(Continued)

OTHER PUBLICATIONS

International Search Report in PCT/EP2020/070901, dated Oct. 7, 2020.
(Continued)

*Primary Examiner* — Ha Dinh Ho
(74) *Attorney, Agent, or Firm* — Collard & Roe, P.C.

(57) ABSTRACT

A coaxial gear set comprising: a crankshaft which can be rotated about an axis of rotation and has at least one connecting rod bearing; and multiple, preferably at least three, pistons, each connected to the crankshaft by means of a connecting rod and which each have a toothing with at least one tooth on a first end face facing away from the axis of rotation. The coaxial gear set also comprises: a hollow shaft having internal toothing, wherein the pistons are located inside the hollow shaft when viewed in a plane normal to the axis of rotation; and a guide unit, wherein the pistons are each linearly guided in the guide unit and can be moved back and forth parallel to a radial direction normal to the axis of rotation, as a result of which the toothings of the first end faces of the pistons can be successively brought into meshing engagement with the internal toothing and out of meshing engagement with said internal toothing.

15 Claims, 4 Drawing Sheets

(58) Field of Classification Search
USPC .......................................................... 74/640
See application file for complete search history.

(56) References Cited

U.S. PATENT DOCUMENTS

| | | | |
|---|---|---|---|
| 5,351,568 | A | 10/1994 | Feterl |
| 6,805,025 | B2 | 10/2004 | Ruttor |
| 8,307,738 | B2 * | 11/2012 | Schmidt .................. F16H 25/06 74/640 |
| 8,656,809 | B2 | 2/2014 | Bayer et al. |
| 10,100,913 | B2 * | 10/2018 | Schreiber .............. F16H 49/001 |
| 10,683,922 | B2 * | 6/2020 | Schreiber .............. F16H 49/001 |
| 10,935,121 | B2 | 3/2021 | Kobayashi |
| 2005/0268872 | A1 | 12/2005 | Klindworth |
| 2010/0024593 | A1 | 2/2010 | Schmidt et al. |
| 2010/0077882 | A1 * | 4/2010 | Schreiber ................ F16H 25/06 74/462 |
| 2014/0256495 | A1 * | 9/2014 | Waide ................... F16H 49/001 475/167 |
| 2016/0298748 | A1 * | 10/2016 | Schreiber .............. F16H 49/001 |
| 2017/0211677 | A1 * | 7/2017 | Kiyosawa ............... F16H 55/12 |

FOREIGN PATENT DOCUMENTS

| | | |
|---|---|---|
| DE | 312164 C | 2/1916 |
| DE | 10 2006 042 786 A1 | 3/2008 |
| DE | 10 2015 105 520 A1 | 10/2016 |
| DE | 10 2015 105 523 A1 | 10/2016 |
| EP | 0 201 730 A1 | 11/1986 |
| JP | 2010-520426 A | 6/2010 |
| JP | 2010-523906 A | 7/2010 |
| WO | 01/66974 A1 | 9/2001 |
| WO | 2008/028540 A1 | 3/2008 |
| WO | 2018/229987 A1 | 12/2020 |

OTHER PUBLICATIONS

Japanese Office Action in Japanese Application No. 2021-577945 dated Aug. 22, 2023 with English translation.

* cited by examiner

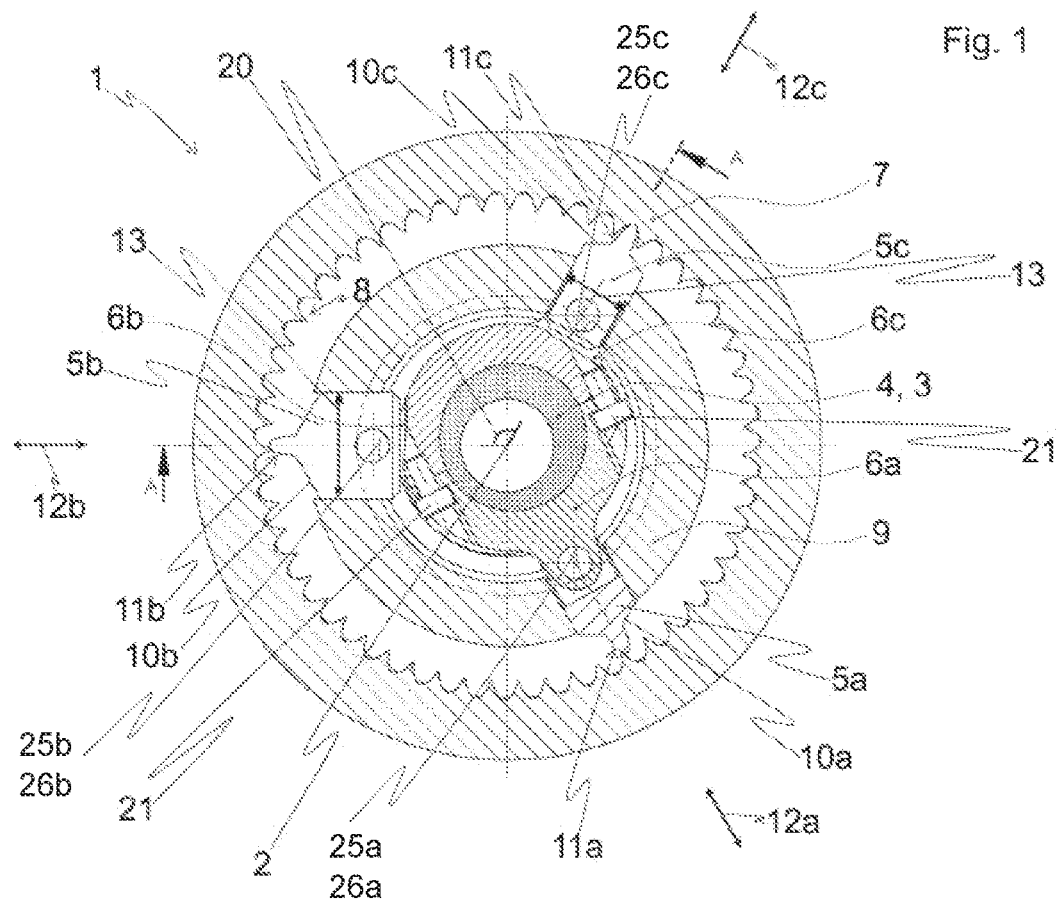
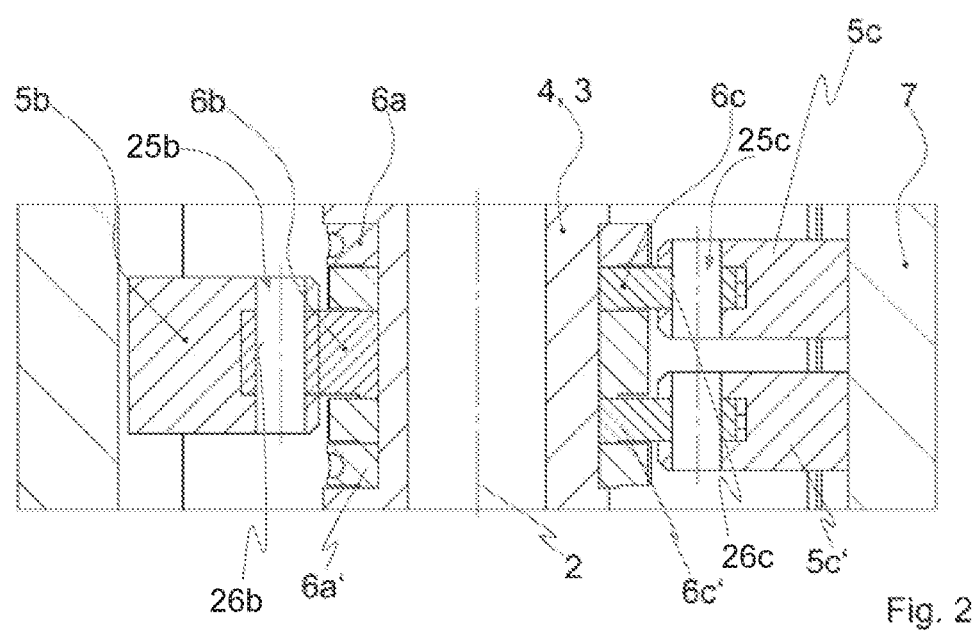
Fig. 1
Fig. 2

COAXIAL GEAR SET

CROSS REFERENCE TO RELATED APPLICATIONS

This application is the National Stage of PCT/EP2020/070901 filed on Jul. 24, 2020, which claims priority under 35 U.S.C. § 119 of Austian Application No. A 50680/2019 filed on Jul. 26, 2019, the disclosure of which is incorporated by reference. The international application under PCT article 21(2) was not published in English.

FIELD OF THE INVENTION

The present invention relates to a coaxial gear set comprising a crankshaft rotatable about an axis of rotation and having at least one connecting rod bearing.

DESCRIPTION OF THE PRIOR ART

DE 312164 C describes a self-locking gearbox in which a number of arms arranged in a star shape around a drive shaft are mounted with their inner ends eccentrically on the drive shaft, lie with their central part in guides and engage with their outer ends in a gear rim. In this case, the arms are designed as two-armed levers, the pivots of which are guided in a crosshead-like manner and the inner ends of which rest independently of one another on the driving eccentric, so that the outer ends execute a connecting rod movement and thereby engage successively in the gear rim and drive the latter in the sense opposite to the rotation of the drive shaft. Thus a cycloidal motion results, and from this results a line contact of the outer ends with the teeth of the gear rim.

Analogous gears are known from U.S. Pat. No. 5,351,568 A, US 2005268872 A1 and WO 0166974 A1, in which cycloidal motion and thus line contact occur.

The line contact has a disadvantageous effect in that it limits the transmittable torques.

Gear sets without connecting rods are known from the following publications: EP 0201730 A1 relates to a reduction gear with radially reciprocating tooth-like elements driven by means of an offset, rotatable circular disc. Similarly, DE 102015105523 A1, WO 2008028540 A1 and DE 102015105520 A1 all relate to gear sets with a tooth carrier for accommodating teeth arranged about an axis of rotation of the gear set, wherein the teeth are arranged in the tooth carrier so as to be displaceable and guided in the radial direction, and wherein a drive element in the form of a contoured thrust washer is provided for driving the teeth, which drive element is rotatable about the axis of rotation.

OBJECT OF THE INVENTION

It is therefore the object of the present invention to provide a gear set which avoids the above-mentioned disadvantage. In particular, it should be possible to transmit high torques, preferably with a small overall size. Particularly preferably, a high transmission ratio and a high accuracy or zero backlash are to be achieved.

SUMMARY OF THE INVENTION

In order to solve the above-mentioned problem, a coaxial gear set is provided according to the invention, comprising a crankshaft rotatable about an axis of rotation and having at least one connecting rod bearing, the coaxial gear set further comprising a plurality of, preferably at least three, pistons, which are connected to the at least one connecting rod bearing by means of a connecting rod in each case and each comprise, on a first end face facing away from the axis of rotation, a toothing with at least one tooth, the coaxial gear set further comprising a hollow shaft with internal toothing, wherein the pistons are arranged inside the hollow shaft when viewed in a plane normal to the axis of rotation, the coaxial gear set further comprising a guide unit, wherein the pistons are each linearly guided in the guide unit and are movable back and forth parallel to a radial direction normal to the axis of rotation, whereby the toothings of the first end faces of the pistons can be brought successively into meshing engagement with the internal toothing and into a state detached from the internal toothing, in order to further rotate the hollow shaft or the guide unit about the axis of rotation during the respective meshing engagement with planar contact between the respective toothing and the internal toothing.

The coaxial gear set according to the invention may also be referred to as a crankshaft transmission.

The crankshaft represents a drive element or can be described as a drive element.

Preferably, as viewed in a plane normal to the axis of rotation, the crankshaft is arranged at least in sections within the hollow shaft.

The connecting rod bearing may also be referred to as a crank journal or crank pin, wherein the connecting rods are supported on the at least one connecting rod. In principle, a plurality of connecting rods, preferably all connecting rods, may be supported on one connecting rod bearing, so that only one connecting rod bearing need be provided. However, several connecting rod bearings or crank journals or crank pins can also be provided, in particular in the case of connecting rods arranged one behind the other along the axis of rotation, wherein preferably one crank pin can be provided per connecting rod.

It should be noted that by connecting several connecting rod bearings or crank pins in series and adjusting the angle of rotation offset between them, the resolution and/or transmission ratio of the gear set can be influenced.

The hollow shaft is preferably mounted to rotate about the axis of rotation and can act as an output element.

Alternatively, if the hollow shaft is fixed, the guide unit can act as the output element, for which the guide unit must be rotatably mounted.

In order to be able to further rotate the hollow shaft or, optionally, the guide unit in a certain direction, three pistons are preferably provided. The further rotation is effected by planar pressing of the toothing of the first end face of one of the pistons against the internal toothing of the hollow shaft, while the other pistons exert hardly any or no pressing force on the internal toothing.

Typically, with three pistons provided, one piston is engaged with the internal toothing and presses against it. Meanwhile, the remaining two pistons exert little or no pressing force on the internal toothing. Preferably, at least one of the remaining two pistons is partially engaged with the internal toothing to create zero backlash. Preferably, at least one of the remaining two pistons does not contact the internal toothing at all.

Generally, in the case of several pistons, zero backlash can be ensured by the simultaneous, at least partial engagement of at least two pistons with the internal toothing.

A very large transmission ratio results from this mode of operation. Furthermore, very high torques can be transmitted from the crankshaft to the hollow shaft or, optionally, the guide unit due to the planar pressing or the two-dimensional contact between the toothing of the respective first end face with the internal toothing of the hollow shaft, which is in contrast to solutions known from the prior art with line contact or linear engagement.

The number of pistons can be kept correspondingly low, or the coaxial gear set according to the invention can be dimensioned to be correspondingly compact. The provision of a very large number of pistons, wherein a plurality of pistons press against the internal toothing simultaneously and substantially with the same effect with the toothing of their first end faces, in order to be able to transmit particularly high torques, is also possible in the coaxial gear set according to the invention, but is usually not necessary in practice.

The linear movement of the pistons is essential for planar contact. In addition, the toothings and the internal toothing can be geometrically designed or optimized accordingly in order to further increase the pressing or the planar contact, and thus the transmission of high torques.

With at least three pistons, it can be ensured that the next piston, which presses with the toothing of its first end face against the internal toothing, does not turn the hollow shaft or, optionally, the guide unit back in the opposite direction and that there is merely a back and forth oscillation of the hollow shaft or, optionally, the guide unit about the axis of rotation. Such a case, on the other hand, cannot be excluded in principle in the case of two pistons, but in the case of two pistons an additional element, e.g. a kind of escapement or freewheel, may be provided which allows the hollow shaft or, optionally, the guide unit to rotate only in a certain direction, thus enabling the hollow shaft or, optionally, the guide unit to continue rotating even with only two pistons.

The toothing of the first end faces may also be referred to as toothing imprinted on the first end face.

The guide unit can be constructed in one piece or composed of several elements.

Due to the linear guidance of the pistons in the guide unit, the pistons accordingly only move linearly parallel to the respective radial direction, wherein the radial direction assigned to the respective piston is defined by the guide unit.

The linear guides can be formed in particular by hollow cylinders in the guide unit, in which the pistons are arranged. In this case, the radial direction associated with the respective piston is defined by the respective cylinder axis.

It should be noted once again that, as will be explained further below, cases are possible in which the guide unit is not fixed but can rotate. Accordingly, the radial directions assigned to the pistons then change due to the rotation of the guide unit or, strictly speaking, mathematically, there are an infinite number of radial directions over a period of time in which the guide unit rotates.

Furthermore, the coaxial gear according to the invention can be locked by one of the pistons remaining at top dead center, i.e. at maximum advance of the piston in the respective radial direction away from the axis of rotation, whereby the functionality of a brake can be realized.

A further advantage of the coaxial gear set according to the invention is that a high dynamic is made possible because the at least one crank pin of the crankshaft describes a circular movement about the axis of rotation and preferably itself has a circular cross-section perpendicular to the axis of rotation, so that mass balancing can be implemented very simply, for example in a manner known per se by means of balancing weights on the crankshaft.

Furthermore, a modular design can be realized by using connecting rods and pistons. By varying the number of pistons, the angular offset around the axis of rotation and their distribution on different crank pins, the gear stage can be variably adjusted. This results in different gear ratios while at the same time allowing the dimensions of the gear set to be maintained. The modular design of the gear set allows individual components to be mass-produced without losing flexibility in the product, thus ensuring rapid availability.

In order to further increase the magnitude of the transmittable torques, it is provided in a preferred embodiment of the coaxial gear set according to the invention that the toothings of the first end faces each have several, preferably three, teeth. With the number of teeth of the toothings of the first end faces, the area with which the respective piston can press against the internal toothing is increased, which enables the transmission of particularly large torques between the crankshaft and the hollow shaft or, optionally, the guide unit.

In a preferred embodiment of the coaxial gear set according to the invention, it is provided that, as viewed along the axis of rotation, the connecting rods are arranged one behind the other. Such a coaxial gear set is advantageous in terms of manufacturing technology.

In order to enable a particularly space-saving design, it is provided in a preferred embodiment of the coaxial gear set according to the invention that the connecting rods lie, at least in sections, in a common plane which is normal to the axis of rotation. For this purpose, the connecting rods may be arranged interleaved in sections. Accordingly, the at least one connecting rod bearing or the crankshaft can be dimensioned to be short along the axis of rotation.

In order to provide a structurally simple solution for such an arrangement, it is provided in a particularly preferred embodiment of the coaxial gear set according to the invention that, in a plane extending parallel to the axis of rotation and/or comprising the axis of rotation, at least one, preferably at least two, of the connecting rods have a substantially U-shaped or J-shaped cross-section.

In a preferred embodiment of the coaxial gear set according to the invention, it is provided that at least two of the pistons have different diameters, wherein the diameters are each measured in a transverse direction and the respective transverse direction is normal to the respective radial direction. The diameter is referred to here simply as the extension in the transverse direction, i.e. the piston need not in principle have a circular cross-section in a plane normal to the associated radial direction.

In principle, there are infinite numbers of transverse directions per radial direction or piston, wherein in all cases corresponding transverse directions must be used, in order to allow reasonable comparison of diameters, e.g. by corresponding transverse directions lying at same plane or at parallel planes. In particular, all transverse directions can be parallel to the axis of rotation, which in any case allows a meaningful comparison.

Due to the differently dimensioned pistons or piston diameters, a mass balance can be achieved, which is particularly advantageous at high speeds. It is understood that differently dimensioned piston diameters are also conceivable in the case of connecting rods arranged "one above the other".

In a preferred embodiment of the coaxial gear set according to the invention, it is provided that at least one piezoelectric element is provided for at least one of the pistons, preferably for all pistons, in order to change a length of the respective piston measured parallel to the respective radial direction. In this way, an expansion in length due to heat or wear can be compensated.

Furthermore, an increased contact pressure, in particular of the toothings of the first end faces on the internal toothing, can be achieved by the extension by means of a piezo element. This can be used, for example, to increase the braking effect when one of the pistons is at top dead center.

In a preferred embodiment of the coaxial gear set according to the invention, it is provided that the pistons each have a toothing with at least one tooth on a second end face opposite the first end face, that an inner ring with external toothing is provided which is mounted rotatably about the axis of rotation, wherein the guide unit is arranged at least in sections between the inner ring and the hollow shaft, wherein the toothings of the second end faces of the pistons can be brought successively into meshing engagement with the external toothing and into a state detached from the external toothing in order to further rotate the inner ring or the guide unit about the axis of rotation during the respective meshing engagement with planar contact between the respective toothing and the external toothing.

The toothing of the second end faces may also be referred to as toothing imprinted on the second end face.

Preferably, the inner ring is rotatably mounted around the axis of rotation and, provided it is not locked, in principle has the function of a shaft and could therefore also be referred to as an inner shaft. Its external toothing faces the internal toothing of the hollow shaft.

In principle, what was said about the engagement of the toothing of the first end faces in the internal toothing of the hollow shaft applies analogously to the engagement of the toothing of the second end faces in the external toothing of the inner ring, which is why reference is made principally to the statements made above. This means that due to the planar contact or the planar pressing between the toothing of the second end face of the respective piston and the external toothing of the inner ring, high torques can be transmitted between the crankshaft and the inner ring or, optionally, the guide unit, which is in contrast to solutions with linear contact.

Furthermore, several, in particular three, teeth can be provided in each case in the toothings of the second end faces in order to transmit particularly large torques between the crankshaft and the inner ring or, optionally, the guide unit.

With the guide unit braked or fixed, one or each piston alternately drives the hollow shaft and the inner ring. Both the inner ring and the hollow shaft can act as the output. It is also possible for only the hollow shaft or the inner ring to act as the output, with the other element being braked or locked.

Since the inner ring has a smaller diameter than the hollow shaft, lower tangential speeds can be achieved or tapped at the same angular speeds. This means that the inner ring and the hollow shaft can provide two output drives for different speeds at the same time, which means that a second gear set can be saved depending on the application.

The inner ring can, but does not have to, be connected to the hollow shaft in a torque-proof manner, wherein a higher resolution of the coaxial gear set can be achieved on the one hand and on the other hand the transmission of even greater torques.

Furthermore, embodiment variants with only two pistons are conceivable, in which by means of the inner ring, due to the total of four (piston) engagements, it is ensured that the hollow shaft or, optionally, the guide unit is only moved further in a certain direction.

Finally, it is also possible that the inner ring is rotated in the opposite direction compared to the direction of rotation of the hollow shaft.

In a particularly preferred embodiment of the coaxial gear set according to the invention, it is provided that the internal toothing of the hollow shaft and the external toothing of the inner ring have the same number of teeth. Equal angular velocities of the hollow shaft and the inner ring can thus be guaranteed. The geometries or contours of the internal toothing and the external toothing are correspondingly designed differently, i.e. with comparatively larger teeth or tooth spacings of the internal toothing of the hollow shaft.

In a preferred embodiment of the coaxial gear set according to the invention, it is provided that in at least two of the pistons the respective radial directions enclose an angle not equal to zero measured about the axis of rotation. This means that the pistons have at least a partial angular offset relative to one another. This influences the behavior of the coaxial gear. In addition to a harmonic rotation, disharmonic movements are also possible, wherein an area of application for such coaxial gear sets can be, for example, vibrators. The angular offset results in teeth of the internal toothing being skipped depending on the angle of the pistons to each other and/or the direction of rotation of the hollow shaft or, optionally, the guide unit changes.

In a preferred embodiment of the coaxial gear set according to the invention, it is provided that the crankshaft is hollow in order to be able to guide cables through the crankshaft, preferably along the axis of rotation, without twisting.

In a preferred embodiment of the coaxial gear set according to the invention, it is provided that the guide unit is arranged immovable relative to the axis of rotation. In this case, the hollow shaft is moved further and functions as the output element. Optionally, in such embodiment variants the inner ring (if present) can also be moved further, which in turn can be braked or can act as an output element.

In a preferred embodiment of the coaxial gear set according to the invention, it is provided that the guide unit is rotatably mounted about the axis of rotation, wherein preferably means are provided to brake a rotation of the guide unit about the axis of rotation. With the guide unit braked, the hollow shaft can further be rotated and used as an output element. Means for braking the guide unit are known per se, for example braking can be effected by means of friction or by means of eddy current.

If however the hollow shaft is fixed or braked, by means known per se, as mentioned above as an example for the guide unit (i.e. e.g. by means of friction or eddy current), the guide unit will function as an output element.

BRIEF DESCRIPTION OF THE FIGURES

The invention will now be explained in more detail with reference to exemplary embodiments. The drawings are exemplary and are intended to illustrate the idea of the invention, but in no way to restrict it or even to reproduce it conclusively, wherein:

FIG. 1 shows a schematic sectional view of a coaxial gear set according to the invention, wherein connecting rods are arranged one behind the other as seen along an axis of rotation;

FIG. 2 shows a sectional view according to sectional line A-A of FIG. 1, wherein the arrows indicate the direction of view;

DETAILED DESCRIPTION OF THE PREFERRED EMBODIMENTS

Figure 3:
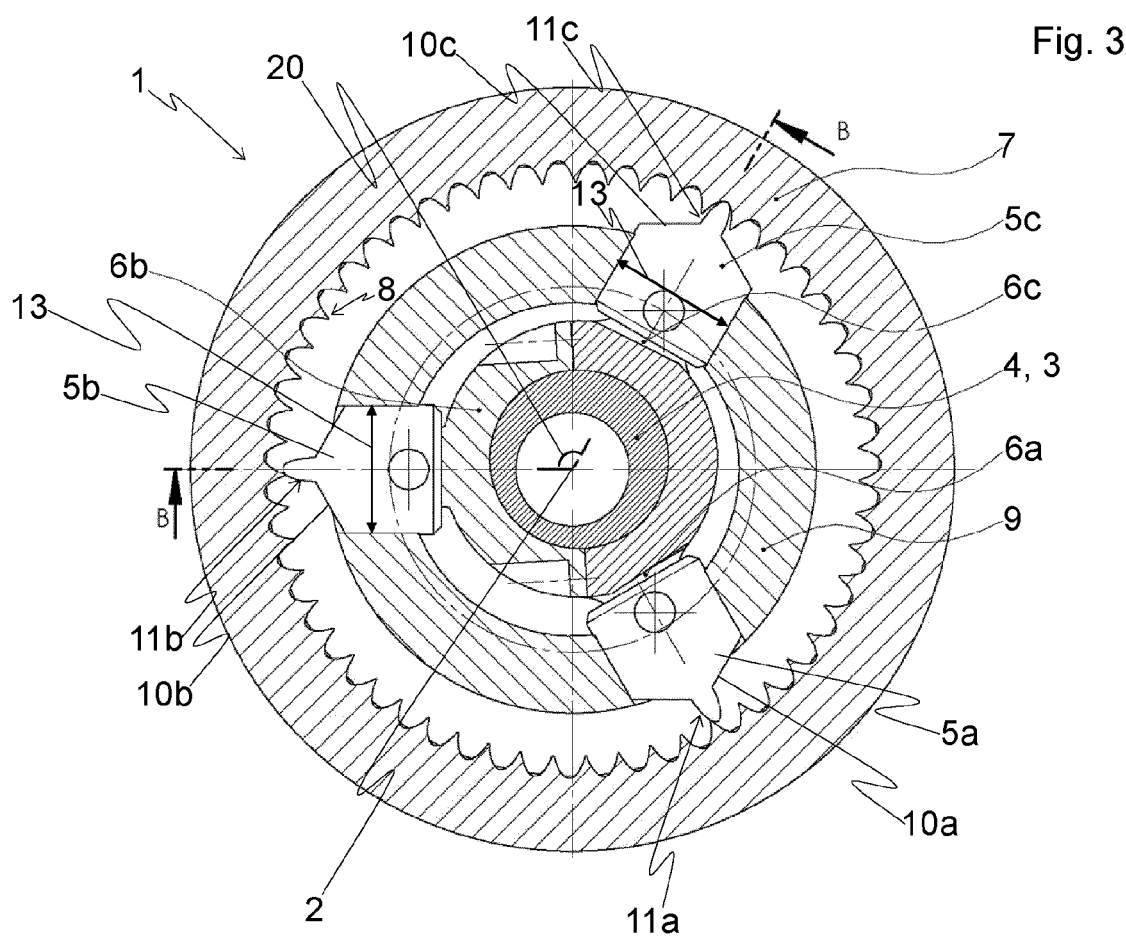
FIG. 3 shows a schematic sectional view of a further embodiment of the coaxial gear set according to the invention, wherein the connecting rods lie, at least in sections, in a common plane which is normal to the axis of rotation.

In FIG. 1, a schematic view of a section normal to an axis of rotation 2 shows a coaxial gear set 1 or crankshaft transmission according to the invention. The coaxial gear set 1 comprises a crankshaft 3 rotatable about the axis of rotation 2 and having at least one connecting rod bearing 4, wherein in the illustrated exemplary embodiment exactly one connecting rod bearing 4 or exactly one crank journal or crank pin is provided.

Several pistons are connected to the connecting rod bearing 4 in a manner known per se or the pistons are movably mounted on the connecting rod bearing 4, in each case a divided connecting rod eye 26a, 26b, 26c of connecting rods 6a, 6b, 6c is fastened to the connecting rod bearing 4 by means of screws 21, cf. FIG. 1, and pistons 5a, 5b, 5c are connected to further connecting rod eyes 26a, 26b, 26c of the connecting rods 6a, 6b, 6c via piston pins 25a, 25b, 25c. In the exemplary embodiment of HQ. 1, a total of five pistons are provided, although only the three pistons 5a, 5b, 5c are visible in FIG. 1. The piston 5a is connected to the crankshaft 3 or the connecting rod bearing 4 via the connecting rod 6a, the piston 5b via the connecting rod 6b and the piston 5c via the connecting rod 6c.

All of the pistons 5a, 5b, 5c each have a first end face 10a, 10b, 10c facing away from the axis of rotation 2 and having an imprinted toothing 11a, 11b, 11c, wherein the respective toothing 11a, 11b, 11c comprises exactly one tooth in the exemplary embodiment shown.

In the illustrated exemplary embodiment, as can be seen from FIG. 1, the crankshaft 3 is hollow along the axis of rotation 2, which allows, for example, cables (not shown) to be passed through without twisting.

Furthermore, a hollow shaft 7 is provided in the coaxial gear set 1, which has an internal toothing 8. In the image plane of FIG. 1, which is perpendicular to the axis of rotation 2, the pistons 5a, 5b, 5c—and at least in sections the crankshaft 3—are arranged inside the hollow shaft 7. This also applies to a guide unit 9 in which the pistons 5a, 5b, 5c are each guided linearly and can be moved back and forth parallel to a radial direction 12a, 12b, 12c which is perpendicular to the axis of rotation 2. For this purpose, the guide unit 9 in the illustrated exemplary embodiment has hollow cylinders which act as linear guides for the pistons 5a, 5b, 5c.

As a result of the reciprocating movement of the pistons 5a, 5b, 5c, the toothings 11a, 11b, 11c of the first end faces 10a, 10b, 10c of the pistons 5a, 5b, 5c are successively brought into meshing engagement with the internal toothing 8 and into a state disengaged from the internal toothing 8, wherein, due to the linear movement of the pistons 5a, 5b, 5c during the respective engagement, a planar contact between the respective toothing 11a, 11b, 11c and the internal toothing 8 can be ensured and the respective toothing 11a, 11b, 11c presses planarly against the internal toothing 8. As a result, the hollow shaft is rotated a little further about the axis of rotation 2 if the guide unit 9 is arranged immovably relative to the axis of rotation 2 or if the guide unit 9 is arranged rotatably about the axis of rotation 2 but is braked. If, on the other hand, the hollow shaft 7 is fixed or immovable with respect to the axis of rotation 2 or is braked, the guide unit 9 (which is rotatably mounted about the axis of rotation 2) is rotated a little further. Due to the two-dimensional engagement or pressing, very high torques can be transmitted from the crankshaft 3 to the hollow shaft 7 or, optionally, the guide unit 9.

In the exemplary embodiment of FIG. 1, the connecting rods 6a, 6b, 6c are arranged one behind the other on the crankshaft 3 or the connecting rod bearing 4 as seen along the axis of rotation 2. This is illustrated in the sectional view of FIG. 2 (according to the sectional line A-A of FIG. 1, wherein the arrows indicate the direction of view), in which a fourth piston 5c' and an associated connecting rod 6c' as well as a connecting rod 6a' of a fifth piston (not shown, this piston, as viewed in the direction of the drawing plane of FIG. 1, lies behind the elements shown in FIG. 1 or, as viewed along the axis of rotation 2, is the last piston, the piston 5a being the first) can also be seen.

In order to ensure effective and at the same time space-saving mass balancing, in particular for relatively high speeds, different piston diameters 13 are provided in the exemplary embodiment shown in FIG. 1, wherein the piston diameters 13 are each measured in a transverse direction and the respective transverse direction is normal to the respective radial direction 12a, 12b, 12c. Specifically, the piston 5b has a larger piston diameter 13 than the pistons 5a and 5b, with all the pistons except the piston 5b having the same piston diameter 13 (therefore, for clarity, the piston diameter 13 of the piston 5a is not specially drawn in FIG. 1).

It should be noted that in the illustrated exemplary embodiment, the pistons 5a, 5b, 5c have a circular cross-section in sections arranged in the hollow cylinders of the guide unit 9, wherein the respective cross-section lies in a plane normal to the respective radial direction 12a, 12b, 12c.

As can also be seen from FIG. 1 and FIG. 2, some pistons 5a, 5b, 5c have an angular offset 20 from each other measured about the axis of rotation 2. This means that the radial directions 12a, 12b, 12c associated with the respective pistons 5a, 5b, 5c each enclose with each other a non-zero angle measured about the axis of rotation 2. Specifically, in the illustrated exemplary embodiment, the angular offset 20 between the piston 5a and the piston 5b or the angle between the radial direction 12a and the radial direction 12b is 120°. Analogously, the angular offset 20 between the piston 5b or 5c and the piston 5c or 5a or the angle between the radial direction 12b or 12c and the radial direction 12c or 12a is 120°.

The piston 5c' is arranged at the same angular position around the axis of rotation 2 as the piston 5c, cf. FIG. 2. The fifth piston (not shown) is arranged at the same angular position around the axis of rotation 2 as the piston 5a.

The angular offset 20 may cause teeth of the internal toothing 8 to be skipped depending on the angle of the pistons 5a, 5b, 5c with respect to each other and/or may change the direction of rotation of the hollow shaft 7 or, optionally, of the guide unit 9. This means that the behavior of the coaxial gear set 1 may be influenced by the angular offset 20.

FIG. 3 shows a schematic sectional view of a further embodiment of the coaxial gear set 1 according to the invention with exactly three pistons 5a, 5b, 5c and three associated connecting rods 6a, 6b, 6c, wherein the connecting rods 6a, 6b, 6c, as viewed along the axis of rotation 2, do not lie one behind the other but lie, at least in sections, in a common plane which is normal to the axis of rotation 2. This embodiment has a correspondingly extremely compact construction, since the dimensioning parallel to the axis of rotation 2 can be kept correspondingly short.

The pistons 5a, 5b, 5c in the exemplary embodiment of FIG. 3 have the same piston diameter 13. Mass balancing can, for example, be carried out in a manner known per se by means of balancing weights on the crankshaft 3.

Figure 4:
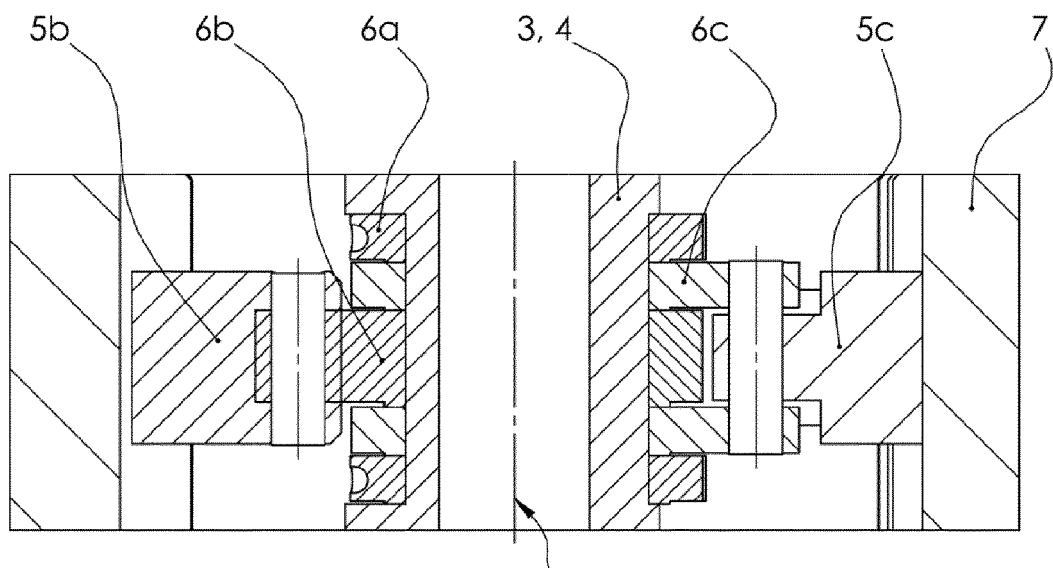
FIG. 4 shows a sectional view according to sectional line B-B of FIG. 3, wherein the arrows indicate the direction of view.

As can be seen from the sectional view of FIG. 4 (according to the sectional line B-B of FIG. 3, wherein the arrows indicate the direction of view), this arrangement of the connecting rods 6a, 6b, 6c "one above the other" is made possible by the fact that the connecting rods 6a and 6c have a substantially U-shaped cross-section in a plane parallel to the axis of rotation 2 and/or comprising the axis of rotation 2. The connecting rod 6b has a substantially I-shaped cross-section, as seen along the axis of rotation 2, arranged between those sections of the connecting rod 6c which form the two parallel legs of the U-shape of the cross-section of the connecting rod 6c. Said sections of the connecting rod 6c, as seen along the axis of rotation 2, are in turn arranged between those sections of the connecting rod 6a which form the two parallel legs of the U-shape of the cross-section of the connecting rod 6a.

Otherwise, the same applies to the embodiment of FIG. 3 as to the embodiment of FIG. 1. In particular, the pistons 5a, 5b, 5c of the embodiment of FIG. 3 also have a mutual angular offset 20 of 120°.

Figure 5:
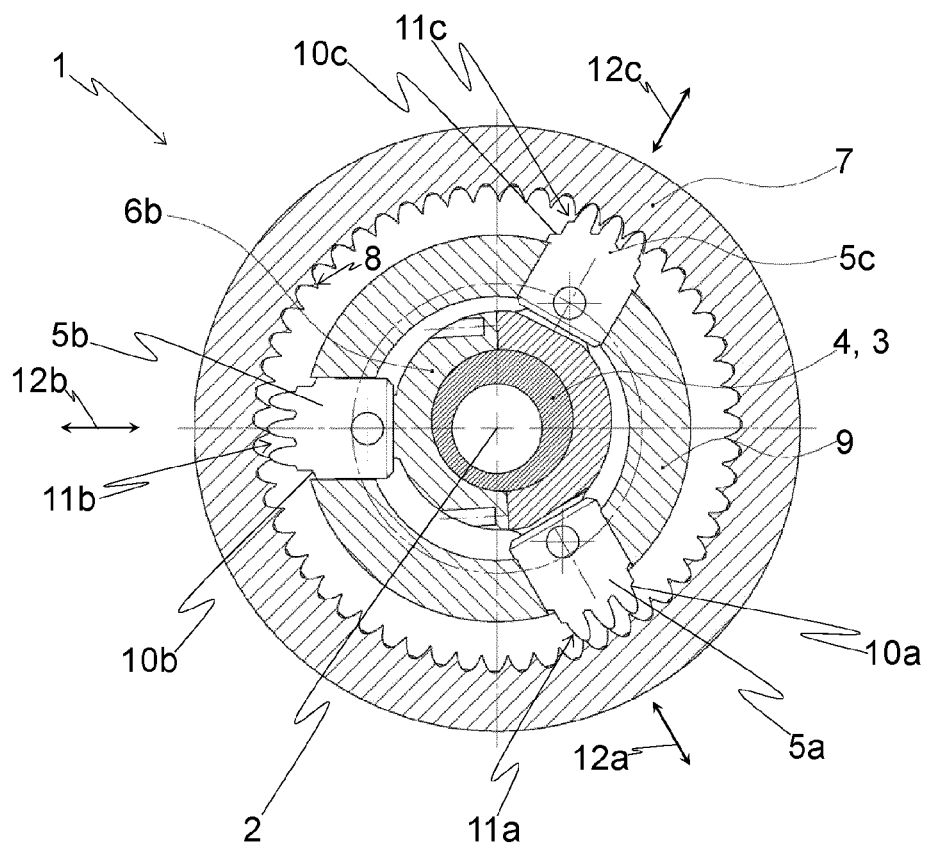
FIG. 5 shows a schematic sectional view of a further embodiment of the coaxial gear set according to the invention analogous to the embodiment of FIG. 3, wherein toothings of first end faces of pistons have several teeth.

In order to further increase the magnitude of the transmittable torques, the toothings 11a, 11b, 11c may each have a plurality of teeth. Such an exemplary embodiment is illustrated in FIG. 5, which otherwise corresponds to that exemplary embodiment of FIG. 3. Specifically, in the exemplary embodiment of FIG. 5, the toothings 11a, 11b, 11c each have three teeth, whereby the amount of transmittable torque can be significantly increased compared to the exemplary embodiment of FIG. 3.

Figure 6:
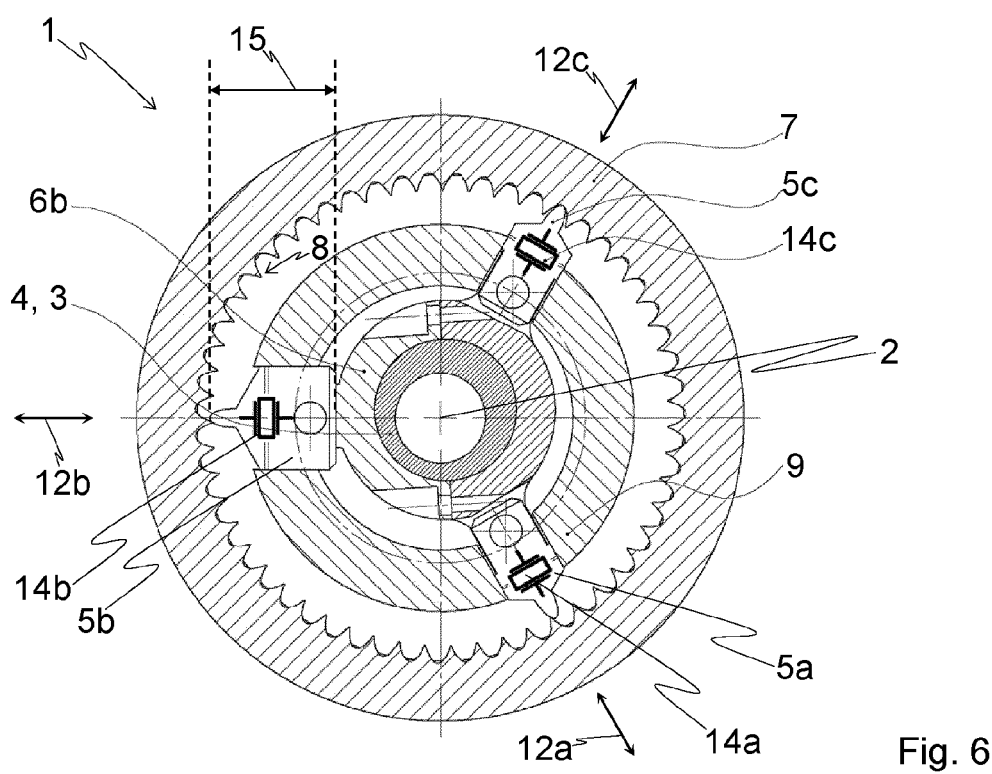
FIG. 6 shows a schematic sectional view of a further embodiment of the coaxial gear set according to the invention analogous to the embodiment of FIG. 1, wherein the pistons comprise piezo elements.

FIG. 6 shows a schematic sectional view of a further embodiment of the coaxial gear set 1 according to the invention analogous to the embodiment of FIG. 1, wherein the pistons 5a, 5b, 5c have piezo elements 14a, 14b, 14c. By means of the piezo elements 14a, 14b, 14c, a piston length 15 (drawn in FIG. 6 only for the piston 5b for reasons of clarity) of the respective piston 5a, 5b, 5c measured parallel to the respective radial direction 12a, 12b, 12c can be changed. In this way, an expansion in length of the pistons 5a, 5b, 5c due to heat or wear can be compensated. Furthermore, by increasing the piston length 15 by means of the piezo elements 14a, 14b, 14c, an increased contact pressure, in particular of the toothings 11a, 11b, 11c of the first end faces 10a, 10b, 10c on the internal toothing 8, can be achieved.

Provided that the pistons 5a, 5b, 5c also each have an impressed toothing 17a, 17b, 17c on a second end face 16a, 16b, 16c opposite the first end face 10a, 10b, 10c, a contact pressure can optionally also be increased there by means of the piezo elements 14a, 14b, 14c.

Figure 7:
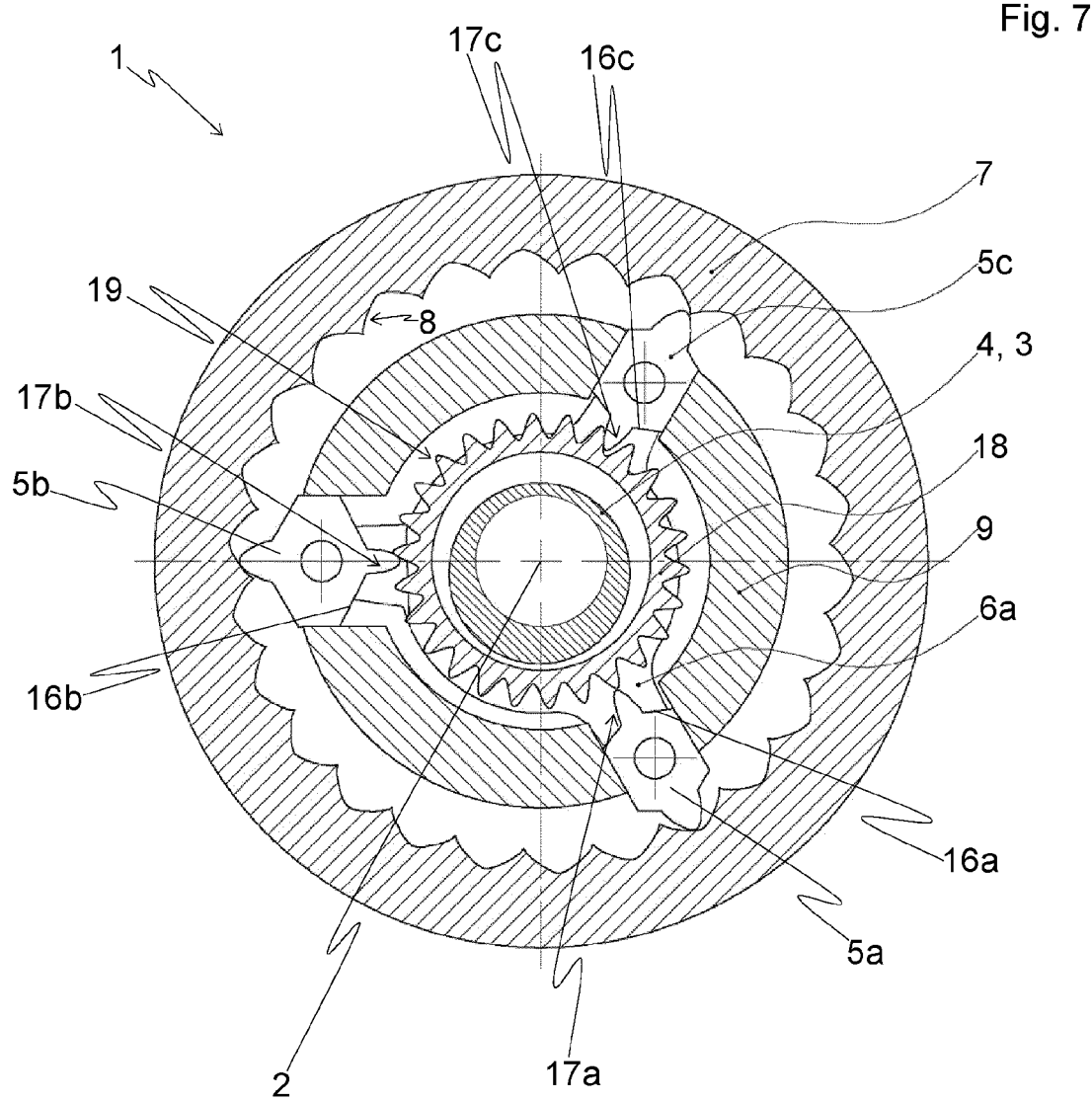
FIG. 7 shows a schematic sectional view of a further embodiment of the coaxial gear set according to the invention analogous to the embodiment of FIG. 1, wherein an inner ring with external toothing is provided.

An embodiment in which the pistons 5a, 5b, 5c have second end faces 16a, 16b, 16c with toothings 17a, 17b, 17c is shown in FIG. 7. This embodiment also has an inner ring 18 and is otherwise analogous to the embodiment of FIG. 1. Accordingly, reference is made in principle to what has been said above about the embodiment of FIG. 1.

In the illustrated exemplary embodiment, the toothings 17a, 17b, 17c each have one tooth, but multiple teeth per toothing 17a, 17b, 17c are possible.

The inner ring 18 has an external toothing 19 facing the internal toothing 8 and is mounted rotatably about the axis of rotation 2. The guide unit 9 is arranged at least in sections between the inner ring 18 and the hollow shaft 7, wherein the toothings 17a, 17b, 17c of the second end faces 16a, 16b, 16c of the pistons 5a, 5b, 5c can be brought successively into meshing engagement with the external toothing 19 and into a state detached from the external toothing 19.

During the respective engagement, due to the linear movement of the pistons 5a, 5b, 5c, a planar contact between the respective toothing 17a, 17b, 17c and the external toothing 19 of the inner ring 18 can be ensured and can press the respective toothing 17a, 17b, 17c in a planar manner against the external toothing 19.

As a result, the inner ring 18 is rotated a little further about the axis of rotation 2 when the guide unit 9 is arranged immovable relative to the axis of rotation 2 or when the guide unit 9 is arranged rotatable about the axis of rotation 2 but is braked. More precisely, when the guide unit 9 is braked or fixed, one or each piston 5a, 5b, 5c alternately drives the hollow shaft 7 and the inner ring 18. Thus, both the inner ring 18 and the hollow shaft 7 can act as an output.

It is also possible for only the hollow shaft 7 or the inner ring 18 to act as an output, in which case the other element is braked or locked.

It would of course also be conceivable that both the hollow shaft 7 and the inner ring 18 are fixed, so that only the guide unit 9 is moved and can act as an output drive.

In particular, in contrast to solutions with linear contact, very high torques can be transmitted between the crankshaft 3 and the inner ring 18 or, optionally, the guide unit 9.

In the exemplary embodiment of FIG. 7, the external toothing 19 has exactly the same number of teeth as the internal toothing 8. The geometries or contours of the internal toothing 8 and the external toothing 19 are accordingly designed differently, i.e. with comparatively larger teeth or tooth spacings of the internal toothing 8 of the hollow shaft 7. Accordingly, the hollow shaft 7 and the inner ring 18 rotate at the same angular velocity. The latter can also be achieved by a rotationally fixed connection of the hollow shaft 7 to the inner ring 18.

Since the inner ring 18 has a smaller diameter than the hollow shaft 7, lower tangential speeds can be achieved or tapped at this at the same angular speeds.

This means that the inner ring 18 and the hollow shaft 7 can provide two output drives for different speeds at the same time, which means that a second gear set can be saved depending on the application.

LIST OF REFERENCE SIGNS

1 Coaxial gear set
2 Axis of rotation
3 Crankshaft
4 Connecting rod bearing
5*1*, 5*b*, 5*c*, 5*c'* Piston
6*a*, 6*a'*, 6*b*, 6*c*, 6*c'* Connecting rod
7 Hollow shaft
8 Internal toothing of the hollow shaft
9 Guide unit
10*a*, 10*b*, 10*c* First end face of piston
11*a*, 11*b*, 11*c* Toothing on the first end face
12*a*, 12*b*, 12*c* Radial direction
13 Piston diameter
14*a*, 14*b*, 14*c* Piezo element
15 Piston length
16*a*, 16*b*, 16*c* Second end face of piston
17*a*, 17*b*, 170 Toothing on the second end face
18 Inner ring
19 External toothing of the inner ring
19 Angular offset
21 Screw
25*a*, 25*b*, 25*c* Piston pins
26*a*, 26*b*, 26*c* Rod eyes

The invention claimed is:

1. A coaxial gear set, comprising:
a crankshaft rotatable about an axis of rotation and having at least one connecting rod bearing, wherein the at least one connecting rod bearing is formed as at least one crank pin,
the coaxial gear set further comprising a plurality of pistons which pistons are connected to the at least one connecting rod bearing by means of a connecting rod in each case, wherein each piston is articulated to a respective connecting rod via a movable bearing and is rotatably connected to a connecting rod eye of the respective connecting rod via a piston pin, wherein each connecting rod is movably mounted on the at least one connecting rod bearing, and each piston comprises, on a first end face facing away from the axis of rotation, a toothing with at least one tooth,
the coaxial gear set further comprising a hollow shaft with internal toothing, wherein the pistons are arranged inside the hollow shaft when viewed in a plane normal to the axis of rotation, and
the coaxial gear set further comprising a guide unit, wherein the pistons are each guided linearly in the guide unit and can be moved back and forth parallel to a radial direction normal to the axis of rotation, as a result of which the toothings of the first end faces of the pistons can be brought successively into meshing engagement with the internal toothing and into a state detached from the internal toothing, in order to further rotate the hollow shaft or the guide unit about the axis of rotation during the respective meshing engagement with planar contact between the respective toothing and the internal toothing.

2. The coaxial gear set according to claim 1, wherein the toothings of the first end faces each have a plurality of teeth.

3. The coaxial gear set according to claim 1, wherein, as viewed along the axis of rotation, the connecting rods are arranged one behind the other.

4. The coaxial gear set according to claim 1, wherein the connecting rods lie, at least in sections, in a common plane which is normal to the axis of rotation.

5. The coaxial gear set according to claim 4, wherein in a plane extending parallel to the axis of rotation and/or comprising the axis of rotation, at least one of the connecting rods has a substantially U-shaped or J-shaped cross-section.

6. The coaxial gear set according to claim 1, wherein at least two of the pistons have different diameters, wherein the diameters are each measured in a transverse direction and the respective transverse direction is normal to the respective radial direction.

7. The coaxial gear set according to claim 1, wherein at least one piezoelectric element is provided at least at one of the pistons in order to change a length of the respective piston measured parallel to the respective radial direction.

8. The coaxial gear set according to claim 1, wherein the pistons each have, on a second end face opposite the first end face, a toothing having at least one tooth, in that an inner ring mounted rotatably about the axis of rotation is provided with external toothing, wherein the guide unit is arranged at least in sections between the inner ring and the hollow shaft, wherein the toothings of the second end faces of the pistons can be brought successively into meshing engagement with the external toothing and into a state detached from the external toothing in order to further rotate the inner ring or the guide unit about the axis of rotation during the respective meshing engagement with planar contact between the respective toothing and the external toothing.

9. The coaxial gear set according to claim 8, wherein the internal toothing of the hollow shaft and the external toothing of the inner ring have the same number of teeth.

10. The coaxial gear set according to claim 1, wherein in at least two of the pistons the respective radial directions enclose an angle measured about the axis of rotation other than zero.

11. The coaxial gear set according to claim 1, wherein the crankshaft is of hollow design.

12. The coaxial gear set according to claim 1, wherein the guide unit is arranged immovable relative to the axis of rotation.

13. The coaxial gear set according to claim 1, wherein the guide unit is rotatably mounted about the axis of rotation.

14. The coaxial gear set according to claim 1, wherein means are provided for braking a rotation of the guide unit about the axis of rotation.

15. The coaxial gear set according to claim 1, wherein each connecting rod has its own connecting rod bearing in a form of its own crank pin.

\* \* \* \* \*